(12) United States Patent
Sterling et al.

(10) Patent No.: US 8,381,602 B2
(45) Date of Patent: Feb. 26, 2013

(54) PUSH FORCE SIMULATOR

(75) Inventors: Andrea Lauren Sterling, Ann Arbor, MI (US); Kale William Hooper, Pinconning, MI (US); Christian Arthur Trager, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 195 days.

(21) Appl. No.: 13/018,480

(22) Filed: Feb. 1, 2011

(65) Prior Publication Data

US 2012/0192659 A1 Aug. 2, 2012

(51) Int. Cl.
*G01L 1/04* (2006.01)
(52) U.S. Cl. .................................................. 73/862.621
(58) Field of Classification Search ............. 73/862.621, 73/150 A, 150 R
See application file for complete search history.

(56) References Cited

U.S. PATENT DOCUMENTS

| | | | | |
|---|---|---|---|---|
| 5,228,348 A | * | 7/1993 | Frigiere | 73/862.05 |
| 5,326,605 A | * | 7/1994 | Ono et al. | 428/41.2 |
| 7,093,641 B2 | | 8/2006 | Sharp | |
| 7,176,889 B2 | * | 2/2007 | Baker et al. | 345/156 |
| 7,998,546 B2 | * | 8/2011 | Wisnudel et al. | 428/40.1 |
| 2009/0104393 A1 | * | 4/2009 | Asano et al. | 428/41.8 |

FOREIGN PATENT DOCUMENTS

EP 0 872 719 A1 10/1998

* cited by examiner

*Primary Examiner* — Lisa Caputo
*Assistant Examiner* — Octavia Davis-Hollington
(74) *Attorney, Agent, or Firm* — Gifford, Krass, Sprinkle, Anderson & Citkowski, P.C.

(57) ABSTRACT

A push force simulator for measuring a force applied to a first component being attached to a second component with a pressure-sensitive adhesive located therebetween. The push force simulator can include a handheld block having a top surface and a bottom surface, and a palm-simulating polymer layer attached to the bottom surface. In addition, a pushable force gauge having an engagement end engaged with the top surface of the handheld block can be included. The pushable force gauge can measure an amount of force applied thereto, and thus measure the force transmitted through the block, through the palm-simulating polymer layer and applied to the pressure sensitive adhesive.

14 Claims, 1 Drawing Sheet

PUSH FORCE SIMULATOR

FIELD OF THE INVENTION

The present invention is related to a push force simulator, and in particular, to a push force simulator that allows an individual to determine how much force should be applied to a pressure-sensitive adhesive being used to attach a first component to a second component.

BACKGROUND OF THE INVENTION

Attachment of components such as emblems, stickers, tags, and the like onto a surface using a pressure-sensitive adhesive such as double-sided tape is known. The attachment of such a component to a surface can include attaching or sticking one side of a piece of double-sided tape to a back side of the component, peeling a backing layer off of an opposite side of the tape, placing the newly exposed side of the double-sided tape up against the surface, and pressing against the component such that the newly exposed side of the tape is pressed against the surface and sticks thereon.

It is appreciated that the attachment of the component to the surface requires that the double-sided tape be pressed with sufficient force such that an appropriate "wet-out" of the tape against the surface is achieved. It is further appreciated that the term "wet-out" refers to the amount of surface covered by the double-sided tape in which there is direct contact between the surface and the tape, as opposed to the amount of surface covered by the tape in which there is space present between the surface and the tape. Stated differently, when a piece of tape is applied to a surface, there will be areas where there is direct contact between the surface and the tape and there will be areas where there is a space present between the surface and the tape.

In some instances the amount of wet-out is referred to as a percentage, i.e. the percentage of the surface covered by the tape in which there is direct contact between the surface and the tape. In addition, a large wet-out is typically desired such that a generally large sticking force is present between the tape and the surface when compared to a generally small wet-out out scenario.

The automotive industry is an industry in which emblems are attached to surfaces using pressure-sensitive adhesives. In addition, after an emblem is attached to a surface, it is commonly desired that the emblem remain attached for prolonged periods of time under a variety of environmental conditions. As such, a consistent application force against the emblem is desired. In addition, emblems can be attached to a surface of a motor vehicle by an individual placing an exposed surface of the pressure-sensitive adhesive against a desired surface on the motor vehicle and pushing on the emblem with his or her palm, hand, etc.

In the event that a new or different emblem is to be attached to a motor vehicle and/or a different pressure-sensitive adhesive is to be used, testing related to attaching the emblem to a surface of a motor vehicle can be desirable in order to determine how much force should be applied to ensure a desired wet-out of the pressure sensitive adhesive occurs. In addition, training an individual to apply a generally specific and desired amount of force to the emblem is desired. However, heretofore methods and apparatus used to determine and/or test the wet-out properties of a pressure-sensitive adhesive have failed to provide a consistent force that would be required by an individual to attach the emblem to the surface and also failed to be able to train the individual with a sense of feel for how much pressure should be applied. Therefore, a push force simulator that can be used to measure and/or determine an amount of force should be applied in order to obtain a proper amount of wet-out for a given pressure-sensitive adhesive and/or emblem would be desirable.

SUMMARY OF THE INVENTION

The present invention discloses a push force simulator for measuring a force applied to a first component pressed against a second component with a pressure-sensitive adhesive therebetween. The push force simulator can include a handheld block having a top surface and a bottom surface, with a palm-simulating polymer layer attached to the bottom surface. In addition, a pushable force gauge that can be engaged with the top surface of the handheld block can be included.

The pushable force gauge has a push end that can be pushed against and used to apply a force to the handheld block. In addition, the force gauge can measure the force transmitted to block, and thus to the palm-simulating polymer, when it is contact with the first component. As such, when an object pushes against the push end of the force gauge, the amount of force can be measured and used to determine if the measured force was sufficient to properly attach the first component to the second component via the pressure-sensitive adhesive.

In some instances, the palm-simulating polymer layer is a soft polyurethane layer which may or may not be a thermoset, polyether-based polyurethane layer. In addition, the pushable force gauge can have an engagement end that engages the handheld block. For example, the engagement end can be attached to the handheld block using threads, an adhesive, a magnet, a weld and the like.

A process for measuring a force applied against a first component being attached to a second component via a pressure-sensitive adhesive is also provided. The process includes providing a push force simulator as disclosed herein, providing a first component having a pressure-sensitive adhesive attached thereto, and providing a second component for the first component to be attached to. Thereafter, the first component can be placed against the second component with the pressure-sensitive adhesive in contact with the second component. The push force simulator can be placed against the first component, and pushed upon such that a force applied to the push force simulator is measured. In some instances, the second component can be a transparent panel and the amount or percentage of wet-out as a function of the force applied against the push force simulator, and thus against the first component, can be determined.

DETAILED DESCRIPTION OF THE PRESENT INVENTION

The present invention discloses a push force simulator that can be used to determine an amount of force applied to an emblem such that it is properly attached to a surface of a motor vehicle. As such, the present invention has utility as a testing or quality assurance device.

The push force simulator can be used to determine an amount of force that should be applied against a first component, e.g. an emblem, that is to be attached to a second component, e.g. a motor vehicle surface, when a pressure-sensitive adhesive is located between and is used to attach the first component to the second component. In addition, the push force simulator can be used to determine the amount of wet-out that a particular pressure-sensitive adhesive exhibits as a function of the force applied thereto. The push force simulator can also simulate the force applied against the first component by an individual with his or her hand, palm, etc. In this manner, the push force simulator can also be used to train an individual how much force is required to properly attach a first component to a second component through the use of a particular pressure-sensitive adhesive.

The push force simulator can include a handheld block having a top surface and a bottom surface with a palm-simulating polymer layer attached to the bottom surface. It is appreciated that the palm-simulating polymer layer is selected such that it in fact simulates the touch or feel of an individual's palm/hand. Engaged with a top surface of the handheld block is a pushable force gauge that can be pushed upon and used to measure a force applied to the handheld block, the palm-simulating polymer layer, the first component and the pressure sensitive adhesive. In the event that the first component has a pressure-sensitive adhesive in contact with a second component, the amount of force required to obtain an acceptable amount of wet-out for the pressure-sensitive adhesive can be determined.

Figure 1:
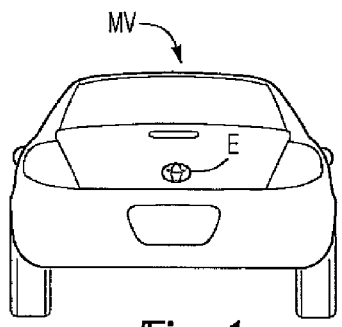
FIG. 1 is a schematic illustration of a motor vehicle with an emblem attached thereto.
Figure 2:
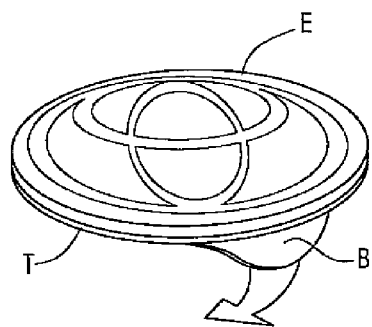
FIG. 2 is a perspective view of an emblem having a pressure-sensitive adhesive attached thereto.

Referring now to FIG. 1, a motor vehicle MV having an emblem E is shown and FIG. 2 provides an enlarged view of the emblem E before being attached to the motor vehicle MV, the emblem E having a pressure-sensitive adhesive T attached to a back side thereof. It is appreciated that a backing layer B can be present and peeled off of the pressure-sensitive adhesive T such that the emblem E can be attached to the motor vehicle MV as is known to those skilled in the art.

Figure 3:
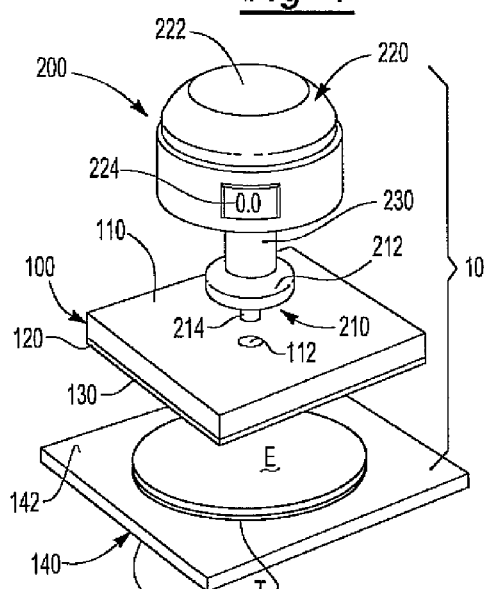
FIG. 3 is a perspective view of a push force simulator according to an embodiment of the present invention.

FIG. 3 provides a perspective view of a push force simulator 10 according to an embodiment of the present invention. The push force simulator 10 can include a block 100, the block 100 having a top surface 110 and a bottom surface 120. Attached to the bottom surface 120 can be a palm-simulating polymer layer 130. It is appreciated that the palm-simulating polymer layer 130 can have physical properties such that it can simulate the sense or feel of an individual's palm, hand, etc. Such a palm-simulating polymer layer can be made from soft polyurethane and may or may not be a thermoset polyether-based polyurethane.

In addition to the block 100, a force gauge 200 can be included. The force gauge 200 can be a pushable force gauge with an engagement end 210 and a push end 220. The engagement end 210 can include a flange 212 and an end rod 214 that afford the engagement end 210 to engage the top surface 110. However, it is appreciated that the end rod 214 is not required; for example, the flange 212 can simply be placed in contact with the top surface 110 such that force applied to the push end 220 is transmitted to the block 100. It is further appreciated that the engagement end 210 can engage the top surface 110 using any method, device, apparatus, etc. known to those skilled in the art, such as the use of an adhesive, threads, a magnet, welding, and the like.

The force gauge 200 can have a shaft 230 that extends from the push end 220 to the engagement end 210. In addition, the push end 220 can have a push surface 222 and a force measurement indicator 224. The force measurement indicator 224 can be any type of indicator known to those skilled in the art, illustratively including a digital readout, a dial readout, a clicking indicator, and the like.

As shown for illustrative purposes only, the handheld block 110 can have an aperture 112 extending from the top surface 110 in a direction towards the bottom surface 120. In addition, the end rod 214 can be placed within the aperture 112, the aperture 112 and the end rod 214 dimensioned such that a complementary fit therebetween is provided and engagement of the engagement end 210 with the block 100 is afforded.

Figure 4:
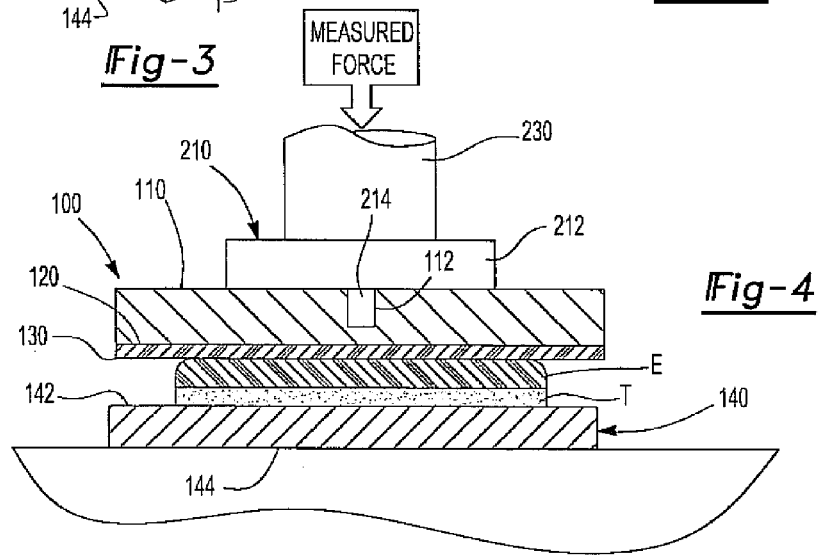
FIG. 4 is a side cross-sectional view of the push force simulator shown in FIG. 3 illustrating the push force simulator being used to attach an emblem onto a surface.

In some instances, a second component in the form of a panel 140 can be included. The panel 140 can have a top surface 142 and a bottom surface 144. In addition, the emblem E can be placed proximate to the top surface 142 such that an exposed surface of the pressure-sensitive adhesive T is in contact therewith. As indicated in FIG. 4, a force can be applied to the force gauge 200 and the magnitude of the applied force can be indicated by the indicator 224. With the engagement end 210 engaged with the block 100, the force is transferred from the force gauge 200, through the block 100, through the palm-simulating polymer layer 130, and onto the emblem E and pressure-sensitive adhesive T.

Figure 5:
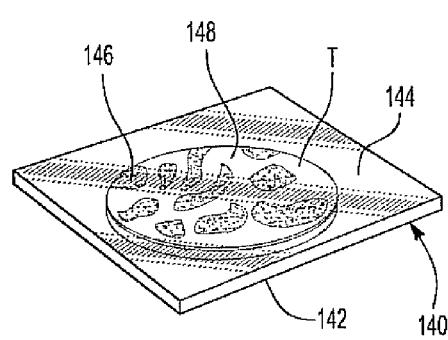
FIG. 5 is a perspective view of a back side of the emblem shown in FIG. 4 after a force has been applied to the emblem using the push force simulator.

The panel 140 can be a clear panel, for example a panel of glass, a panel of poly(methyl methacrylate) (PMMA, Plexiglas), and the like, and after force has been applied to the emblem E, the amount of wet-out can be inspected by turning the panel 140 over and inspecting the bottom side 144. For example, and as shown in FIG. 5, wet-out areas 146 in which the pressure-sensitive adhesive T is in direct contact with the top surface 142 of the panel 140 can be distinguished from non-wet-out areas 148 in which there is a space between the top surface 142 and the pressure-sensitive adhesive T. In this manner, testing can be conducted such that the amount of force required to obtain an acceptable amount of wet-out for a particular pressure-sensitive adhesive can be determined, or in the alternative, whether or not dimensions of a part, emblem, etc. need or can be altered in order to improve wet-out results.

In addition to the above, it is appreciated that the push force simulator can be used with other testing methods, procedures, etc. to determine if desired wet-out occurs for a given amount of force and/or how much force is need in order to obtain a desired amount of wet-out. For example and illustrative purposes only, a non-drying ink can be applied to a complex surface such as a vehicle body with an emblem underside placed on the surface where the ink is present. Thereafter, the push force simulator can be used to apply a given force onto the emblem, the emblem removed and placed onto a clear panel, sheet of transparent material and the like, and examined to see how much of the emblem underside has the non-drying ink thereupon. In the alternative, the a range of forces can be applied in order to determine how much force is required to obtain a desired wet-out.

In operation, a pressure-sensitive adhesive T that is being tested can be placed in contact with a clear panel 140. In addition, a push force simulator 10 can be placed in contact with an emblem E as shown in FIGS. 3 and 4 such that the palm-simulating polymer layer 130 is in contact with a top surface of the emblem E and the pressure-sensitive adhesive T is in contact with the top surface 142 of the panel 140. Thereafter, an individual can push upon the push surface 222 and the amount of force applied thereto can be indicated by the indicator 224. In addition, the bottom surface 144 of the panel 140 that has the emblem E attached thereto can be inspected with the percentage of wet-out areas 146 versus non-wet-out areas 148 determined.

For example and for illustrative purposes only, an individual can apply a force, e.g. 4 pounds of force, when the palm-simulating polymer layer is in contact with a top surface of an emblem E. Thereafter, the amount of wet-out exhibited by the pressure sensitive adhesive T when 4 pounds of force are applied thereto can be measured/determined. If the amount of wet-out is appropriate, then the fact that 4 pounds of force is sufficient to attach the emblem E to a surface can be delivered to one or more individuals responsible for placing such emblems E onto motor vehicles MV. An individual can also use the push force simulator 10 to determine just how much effort must be applied or is required to produce a 4 pound force onto the emblem E. In the alternative, if the force of 4 pounds does not provide sufficient wet-out, an individual can apply a greater force such as 6 pounds, 8 pounds, etc. until sufficient wet-out is obtained. In addition, if it is determined that too much force is needed to obtain a desired wet-out, then a different or alternative pressure-sensitive adhesive can be selected, tested, etc.

The handheld block 100 can be made from any material known to those skilled in the art that is sufficient to transmit a force from the force gauge 200 to the palm-simulating polymer layer 130. For example and for illustrative purposes only, the handheld block can be made from plastics such as nylon, Teflon, and the like; metals; ceramics; wood; etc. In addition, the force gauge 200 can use a load cell, strain gauge and the like to measure a force applied thereto. As such, the force gauge 200 can be any force gauge known to those skilled in the art that can have an engagement end that engages a block and a push surface that can be pushed upon by an individual in combination with a force indicator that can provide the amount of force applied thereto.

The invention is not restricted to the illustrative examples or embodiments described above. The examples or embodiments are not intended as limitations on the scope of the invention. Methods, processes, apparatus, compositions, and the like described herein are exemplary and not intended as limitations on the scope of the invention. Changes therein and other uses will occur to those skilled in the art. The scope of the invention is defined by the scope of the claims.

We claim:

1. A push force simulator for measuring a force applied to a first component being attached to a second component via pressure-sensitive adhesive, said push force simulator comprising:
    a handheld block having a top surface and a bottom surface;
    a palm-simulating polymer layer attached to said bottom surface; and
    a pushable force gauge having an engagement end engaged with said top surface of said block and a push end oppositely disposed and spaced apart from said engagement end;
    wherein a force applied to said push end is measured by said pushable force gauge and transmitted to said palm-simulating polymer when said palm-simulating polymer layer is in contact with the first component and an object pushes against said push end, for the purpose of measuring the force applied to the first component attached to the second component via the pressure-sensitive adhesive.

2. The push force simulator of claim 1, wherein said palm-simulating polymer layer is a soft polyurethane layer.

3. The push force simulator of claim 2, wherein said engagement end is threadingly attached to said handheld block.

4. The push force simulator of claim 2, wherein said soft polyurethane layer is a thermoset, polyether-based polyurethane layer.

5. The push force simulator of claim 1, wherein said engagement end is attached to said handheld block.

6. A process for measuring a force applied against a first component being attached to a second component via a pressure-sensitive adhesive, the process comprising:
    providing a handheld push force simulator having a force gauge operable to measure a force applied to the handheld push force simulator;
    providing a first component having pressure-sensitive adhesive attached thereto;
    providing a second component for the first component to be attached to;
    placing the first component against the second component with the pressure-sensitive adhesive in contact with the second component;
    placing the handheld push force simulator against the first component;
    pushing against the handheld push force simulator, the pushing attaching the first component to the second component; and
    measuring a force applied to the handheld push force simulator by the pushing.

7. The process of claim 6, wherein the handheld push force simulator has a bottom surface with a layer of palm-simulating polymer attached thereto and in contact with the first component when the simulator is placed against the first component.

8. The process of claim 7, wherein the force gauge has a push end operable to be pushed against and transmit a force applied to the push end to the palm-simulating polymer layer in contact with the first component.

9. The process of claim 8, wherein the first component is an emblem with the pressure-sensitive adhesive attached to a back side of the emblem.

10. The process of claim 9, wherein the second component is a transparent panel, the emblem placed in contact with and attached to a front side of the transparent panel.

11. The process of claim 10, further including inspecting a back side of the transparent panel after the emblem has been attached thereto, for the purpose of determining whether or not desirable wet-out of the pressure-sensitive adhesive onto the transparent panel has occurred as a result of the force measured by the force gauge.

12. A process for measuring a force applied against an emblem being attached to a surface, the emblem being attached via a pressure-sensitive adhesive, the process comprising:
    providing a handheld push force simulator having a force gauge operable to measure a force applied to the handheld push force simulator;
    providing an emblem having pressure-sensitive adhesive attached to a back side of the emblem;
    providing a surface for the emblem to be attached to; and
    placing the emblem against the surface with the pressure-sensitive adhesive in contact with the surface;
    placing the handheld push force simulator against the emblem;
    pushing against the handheld force simulator, the pushing attaching the emblem to the surface; and
    measuring a force applied to the handheld push force simulator by the pushing.

13. The process of claim 12, wherein the surface is a front side of a transparent panel.

14. The process of claim 13, further including inspecting a back side of the transparent panel after the emblem has been attached thereto, for the purpose of determining whether or not desirable wet-out of the pressure-sensitive adhesive onto the transparent panel has occurred as a result of the force measured by the force gauge.

* * * * *